United States Patent [19]
Ausbeck, Jr.

[11] Patent Number: 5,956,428
[45] Date of Patent: Sep. 21, 1999

[54] STROKE CODE FOR IMAGE PARTITIONS

[76] Inventor: Paul James Ausbeck, Jr., 74 Carlyn Ave., Campbell, Calif. 95008

[21] Appl. No.: 08/858,754

[22] Filed: May 19, 1997

[51] Int. Cl.$^6$ ........................................................ G06K 9/36
[52] U.S. Cl. ............................................................... 382/242
[58] Field of Search .................................... 382/196, 197, 382/198, 199, 202, 203, 204, 242

[56] References Cited

U.S. PATENT DOCUMENTS

| | | | |
|---|---|---|---|
| 4,087,788 | 5/1978 | Johannesson | 382/242 |
| 4,189,711 | 2/1980 | Frank | 382/242 |
| 4,524,456 | 6/1985 | Araki et al. | 382/242 |
| 4,566,128 | 1/1986 | Araki | 382/242 |
| 4,630,306 | 12/1986 | West et al. | 382/242 |
| 4,777,651 | 10/1988 | McCann et al. | 382/242 |
| 4,956,869 | 9/1990 | Miyatake et al. | 382/242 |
| 5,459,513 | 10/1995 | Oddou | 382/199 |
| 5,524,064 | 6/1996 | Oddou et al. | 382/242 |
| 5,712,928 | 1/1998 | Murayama | 382/242 |

*Primary Examiner*—Jose L. Couso

[57] ABSTRACT

The stroke code for encoding image partitions is disclosed. An image partition may be derived from a natural image via an image segmentation process or may be directly available from map colored images such as commercially available clip art. The stroke code is a language for developing an image partition using three-way chains. Each stroke consists of a starting location, and one or two boundary chains. Each chain of a stroke is terminated by encounters with previously drawn separators or the image boundary. Not all encounters with previously drawn separators terminate a stroke chain. Further information disambiguates each encounter. The stroke language largely retains a three way decision character for each stroke chain and codes each boundary separator only once. Preferred embodiments of a stroke language encoder and a stroke language decoder are disclosed. Stroke location and termination decisions are conditioned with simple context models derived from previously drawn strokes. Stroke chain direction decisions are conditioned with a finite automata context model that is approximately the same size as a depth three Markov model but also captures important features up to depth six. Since the stroke language is comprised entirely of binary decisions it is ideal for use with a binary arithmetic coder.

10 Claims, 10 Drawing Sheets

☐ Stroke Location
○ Associated Separator Lattice Intersection
— Known Separator
⎯ Unknown Separator
⋯ Don't Care

FIG. 3 th  t4  tt  to  ti

○ Encounter
— Known Full Separator Site
⎯ Unknown or Empty Separator Site
⋯ Last Decoded Separator

STROKE CODE FOR IMAGE PARTITIONS

FIELD OF THE INVENTION

The invention is a new method for chain coding an image partition.

REFERENCES

U.S. Pat. No. 5,459,513, Inventor: Christophe Oddou, "Device for Encoding One Contour Side of Segmented Images, and Decoder Therefor", Oct. 17, 1995.

Robert R. Estes. Jr. and V. Ralph Algazi, "Efficient error free chain coding of binary documents", Proc. Data Compression Conference, Snowbird, Utah, Mar. 28, 1995, pp. 122–131.

Martin J. Turner, "Entropy Reduction via Simplified Image Contourization", NASA Space and Earth Science Data Compression Workshop, Snowbird, Utah, Mar. 27, 1992, pp. 27–42.

PRIOR ART

The pixels in a digital image are often thought of as small tightly packed squares sharing common sides with neighbors on the same row and in the same column. An image partition consists of the common sides that lie between pixels that are different in some way. Each of the common sides of differing pixels is a separator.

The pixels may differ in a substantive property such as color or intensity, or they may differ in a more subjective property such as membership in a region determined via an image segmentation process. A contiguous group of pixels that have the same property is called a domain. The portion of a partition that separates two adjacent domains is a boundary. Each boundary is made up of one or more separators.

The most straightforward way to represent a partition is to assign two bits to each pixel in the image. The first of these bits is "1" if a separator exists to the pixel's north and "0" otherwise. The second is "1" only if a separator exists to the pixel's west. The assignment could be any other combination of vertical and horizontal directions such as south and east; the essential feature is that each pixel is assigned one separator site in both the vertical and horizontal directions. The resulting assignment, occupying two bits per pixel in computer memory, is a separator map.

An image partition code is a process for reducing the storage requirements for a separator map. Each such code has three components: a strategy, a context model, and a statistical coding mechanism. These three elements are hierarchically arranged. The strategy is the uppermost level of the hierarchy and defines the decisions made by the code. At the middle level is the context model, where statistical information about strategy decisions is maintained. The statistical coding mechanism is at the lowest level and converts strategy decisions to coded bit patterns using context model statistics.

Of the possible strategies for an image partition code, the family of chain codes is of interest for partitions that contain significantly fewer separators than pixels. The statistical coding mechanism that is most appropriate for use with chain codes is the binary arithmetic coder. This is due to its ability to code a skewed sequence of yes/no decisions using less than 1 bit/decision. To take maximum advantage of an arithmetic coder, the context model must make the yes/no disparity in each decision context as great as possible.

A chain coding strategy must encompass three components: chain starting points, chain direction information, and chain termination indicators. The number of possible chain directions divides the chain code strategies into two major groups: 4-way and 8-way chains. The four-direction chain yields a simpler context model and it has recently received greater attention. In a four-way chain, the possible directions of travel are left, right, forward and backward. Two bits are necessary to directly represent these four possibilities.

The backward direction of travel is most commonly used for backtracking or as a termination indicator. Both of these functions are undesirable in an efficient code. If a chain code backtracks, any separators along the backward path are coded twice. Using the backward direction as a termination indicator effectively introduces the termination decision into every direction decision. Without the backward direction, a four-way chain reduces to a three-way chain. With only three possible directions, the number of bits necessary to represent each direction reduces to $\log_2 3$.

The best strategy, then, for coding four-way chains is reducing them to three way chains. To accomplish this it is essential to develop a way to terminate chains without using the backward direction. A method that works well on black/white images is to assign one chain to each domain and completely traverse its outer boundary. Return to the starting point implicitly terminates each chain.

On a black/white image every domain has a single boundary that separates it from its surround. A domain may also have one or more inner boundaries that separate it from its inclusions. These inner boundaries are equivalent to the outer boundaries of the inclusions. Because of this simplified boundary structure, the outer boundary of any domain does not touch the outer boundary of any other domain and traversing all outer boundaries encounters each separator only once.

Unfortunately, when the number of pixel classes is greater than two, all or part of a domain's outer boundary may touch the outer boundary of other domains. If every outer boundary is traversed some separators may be coded twice. For example a vertical separator may be encountered once when traversing the domain to its left and again when traversing on the right.

Previously proposed methods for dealing with this problem dispense with the abstract boundary separators and trace through the centers of a domain's peripheral pixels. The most straightforward of these approaches traces through every peripheral pixel. This is somewhat efficient for domains that are only one pixel wide, but the need for backtracking is again introduced for domains with irregular shapes like X or T. For wider domains, the double traversal problem shows up again as duplicate parallel boundaries.

U.S. Pat. No. 5,459,513 proposes a strategy for enumerating only the leftmost pixels of each region of a segmentation. But since a domain's leftmost pixels may not necessarily be contiguous in the four-way or even eight-way sense, a conventional chain code no longer suffices to trace through them. The patent describes a relative code where coordinates for the next pixel are transmitted relative to the current pixel. Although it might be adapted for the more general problem of coding the boundaries between domains in an image partition, the method as presented is only directly applicable for coding the boundary between regions of a segmentation and in any case is not a true chain code.

In short, there is no previously disclosed complete strategy for coding image partitions using three-way chains. Because of this, there is also no prior art for using previously coded separators in chain start and termination context models. However, since chain direction coding is very similar for both image partitions and black/white images there is prior art for chain direction context models.

In Proceedings of the Data Compression Conference, Snowbird, Utah, Mar. 28, 1995, pages 122–131, Estes et al disclose the use of the previous N chain directions as a chain direction context model. This model is known as the $N^{th}$ order Markov model. In their experiments N was varied from 0 to 8.

One problem with the Markov approach is what to use as a context when starting a chain. It makes no sense to use directions taken by a previous chain. The solution adopted by Estes et al. used additional contexts shorter than the full model depth for the first few chain directions. Unfortunately, this solution has the effect of increasing the number of model contexts by approximately 50%. For example, if the depth of the model is 5, the number of contexts in increased from $3^5=243$ to $3^5+3^4+3^3+3^2+3^1+3^0=344$.

Another problem is that deep models must be used to capture commonly occurring boundary patterns. For example, a chain following a straight line of slope five falls into one the following patterns: lrsssslrsssss or rlsssss-rlsssss. A model of depth five is not able to predict the most likely turn direction after a series of five straights because the previous turn structure has fallen out of the model. Deeper models capture more types of boundary patterns but exacerbate the sparse context problem just as did adding shorter initial contexts. Counting initial contexts a depth six Markov model contains $3^6+344=1073$ contexts. Use of a full Markov model of depth six or greater is clearly sub-optimal for partitions containing only a few thousand separators.

SUMMARY OF THE INVENTION

The present invention is a method and apparatus for developing an image partition by drawing a series of strokes. Each stroke consists of a starting location, and one or two boundary chains. Each chain of a stroke is terminated by encounters with previously drawn separators or the image boundary. Not all encounters with previously drawn separators terminate a stroke chain. Further information disambiguates each encounter. This technique largely retains a three way decision character for each stroke chain and codes each boundary separator only once.

The invention, hereafter call the stroke code, is comprised entirely of binary decisions and is designed for use with a binary arithmetic coder. It takes good advantage of previously drawn strokes with simple context models for conditioning stroke start and termination decisions. It further develops a finite automata chain direction context model that is approximately the same size as a depth three Markov model but also captures important features up to depth six. Because it is relatively small but still captures deep features, the finite automata model has near optimal performance on partitions covering the range of a few thousand to a few million separators.

DESCRIPTION OF THE INVENTION

Strategy

The stroke strategy is a language for compactly representing an image partition. It is comprised entirely of binary decisions, each of which delivers information about one or more separators of a partition. Each decision is a yes or no answer to a question posed by a stroke decoder. The questions that can be posed by a stroke decoder are shown in Table 1.

TABLE 1

Stroke Code Language Elements

| | |
|---|---|
| Q1 | Is this pixel site a stroke location? |
| Q2 | Does this ambiguous location have two separators? |
| Q3 | Does this ambiguous location with one separator have a western separator? |
| Q4 | Does this stroke chain terminate at this encounter? |
| Q5 | Does this chain continue straight? |
| Q6 | Does this chain that turns turn inward? |

Before processing an input decision stream, a decoder initializes each separator site in the separator lattice to empty. As decisions are decoded and separator sites are filled, boundary continuity is maintained. Continuity means that both ends of each separator must touch at least one other separator end or the image boundary. To simplify the subsequent discussion, the image boundary is implicitly defined as a set of separators at the image periphery. Of course the continuity rule must be relaxed somewhat or separator sites could never be filled. The relaxed criterion is to allow up to two discontinuities to be present during the processing of a stroke.

Each stroke consists of a start point, or location, and one or two stroke chains. A stroke's location is the pixel along whose sides the stroke chain(s) commence. A stroke chain can start either along the western side of its location or the northern side. Each location is associated with the separator lattice intersection at its northwest corner.

Figure 1:
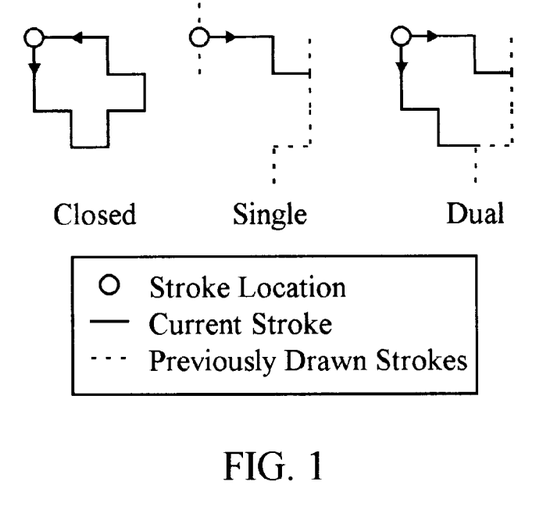
FIG. 1 shows the three types of strokes used to draw image partitions in accordance with the present invention.

The three types of strokes are shown in FIG. 1. A closed stroke consists of a single chain that starts and ends at its associated separator lattice intersection. A single stroke consists of a single chain that starts at one intersection with a previously drawn stroke and ends at another. A dual stroke consists of two chains, each starting in different directions from the same point and terminating at intersections with previously drawn strokes. Limiting strokes in this fashion guarantees that even though discontinuities may exist as a stroke is drawn, the boundary becomes continuous again as each stroke is completed.

As a stroke chain is drawn, the end of the most recently filled separator site that faces the direction of travel is called the head. Points where the head of a stroke chain touches a previously drawn stroke are called encounters. A stroke chain must terminate at some encounter but not necessarily at every encounter. At each encounter where chain continuation is possible without redrawing a separator, the decoder poses a further question to distinguish termination from continuation.

Strokes are decoded in turn: location, direction and termination decisions are interleaved in the decision stream.

Figure 2:
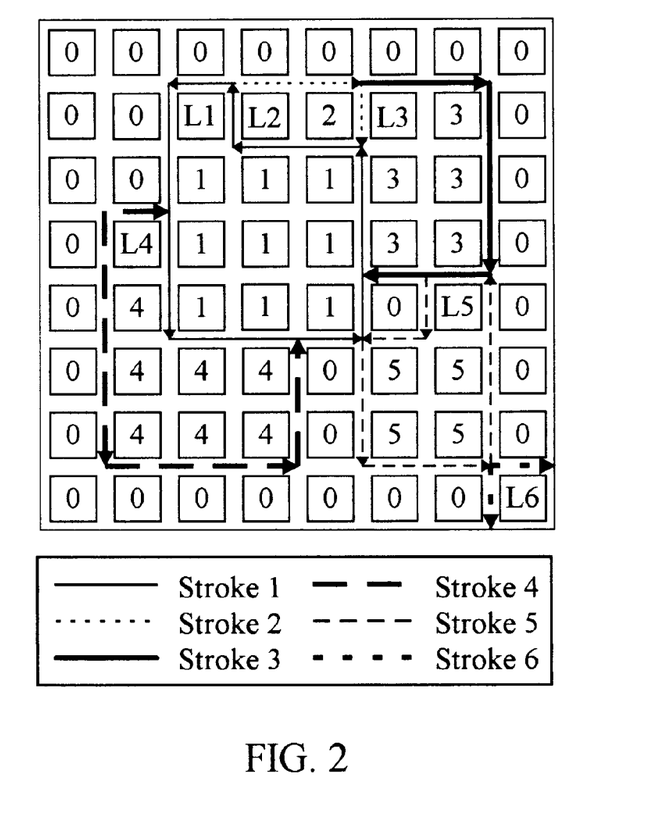
FIG. 2 is an example image partition represented with six strokes in accordance with the present invention.

Once the boundary is fully specified via strokes, domains may be grown by recursively joining groups of pixels that do not have a separator between them. FIG. 2 is an example partition with seven domains of 1, 1, 2, 5, 6, 8 and 10 pixels plus the surround. As can be seen, only six strokes are necessary to completely specify this partition. The stroke at L1 is closed, the strokes at L2, L3, and L5 are single, and the strokes at L4 and L6 dual.

Context Models

The stroke strategy reduces a boundary description to a sequence of binary decisions. It is designed for use with a binary arithmetic coder, but would work with any mechanism for statistically coding a sequence of binary decisions. A sequence of binary decisions can be coded with less than one bit per decision on average if the number of yes decisions is significantly greater than the number of no decisions or vice versa. The skew is the disparity between yes and no decisions in a decision sequence. A context model is a technique for splitting the total number of decisions into a multiplicity of smaller groups that are skewed.

Each of these smaller groups is a context. Separate decision statistics are kept for each context. These statistics are typically counts of the number of yes and no decisions made thus far in the coding process. For each decision, a particular decision context is active. The active context is a function of previously coded decisions. Each decision is coded using the statistics of the active context. The active context's statistics are updated by the statistical coding mechanism following each decision.

The stroke code has three types of contexts, each associated with one of the stroke language elements. Referring to Table 1, questions Q1–Q3 are always posed under stroke location contexts. Q4 is posed under stroke termination contexts. Questions Q5 and Q6 are posed under stroke chain direction contexts. There are 7 stroke location contexts. 5 stroke termination contexts and 116 stroke chain direction contexts.

Stroke Location Context Model

Each pixel in the image is a possible stroke location. Question Q1 is posed to decide whether or not a pixel is a stroke location. Any previously known separators that abut the separator lattice intersection associated with a stroke location determine the stroke location context. Any abutting separators must form one of the five patterns of FIG. 3.

Figure 3:
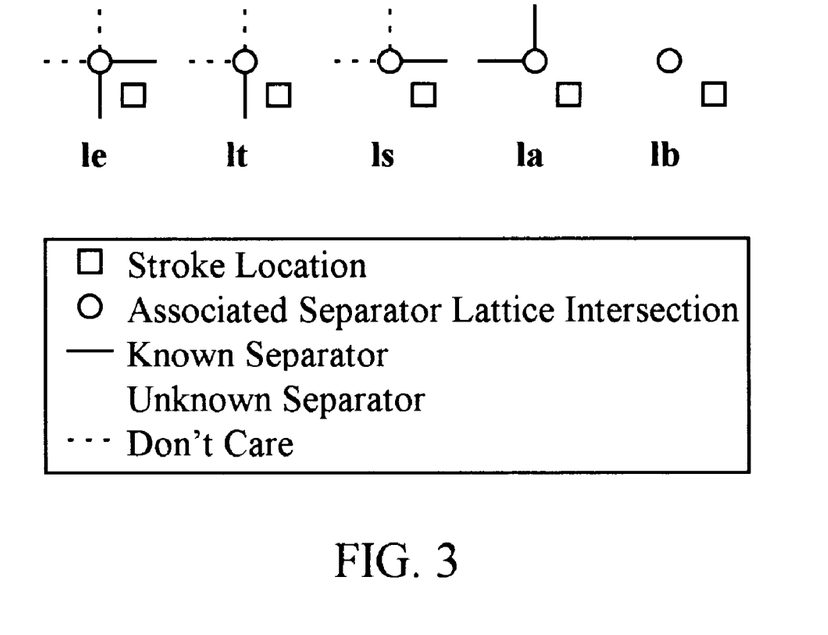
FIG. 3 is a graphical representation of the stroke location context model used in the present invention.

On FIG. 3 a black square represents the pixel associated with a possible stroke location. A black circle represents the associated separator lattice intersection. Separator sites are shown as solid lines, dashed lines, or invisible lines. Solid sites are known to contain a separator and are designated full. Invisible sites are empty. Dashed sites are irrelevant ("don't care").

Each possible stroke location has two associated separator lattice sites each possibly containing a separator. The possible separators are along the northern and western edges of the associated pixel. Deciding that a pixel is not a stroke location does not alter either of the associated separator sites. Full sites remain full and empty sites remain empty.

Deciding that a pixel is a stroke location conveys additional information about the associated separator sites. The additional information conveyed depends upon the stroke location context. If the answer to question Q1 determines that a pixel is a stroke location and it already has one full separator site, then the other site becomes full. If the site to the west is already full, the site to the north becomes full. A stroke location of this type is called a top location. Similarly, a side location has its northern separator site previously full.

If both separator sites of a possible stroke location are empty, it can be either bare or ambiguous. A bare location has no separators impinging on its associated separator lattice intersection. It must be both northernmost and westernmost since it has no other separators with which to connect.

Since it can connect to the boundary corner to its northwest, an ambiguous location can have a separator along its western edge, its northern edge or both. If the answer to question Q1 is yes for an ambiguous location, questions Q2 and Q3 are posed to differentiate between the possibilities. Question Q2 decides two separators or one. If one, question Q3 decides north or west.

TABLE 2

Stroke Location Contexts

| Name | Determining information | Decision |
|------|------------------------|----------|
| le | Two previously known separators (enclosed) | — |
| ls | One known separator to the north (side) | Q1 |
| lt | One known separator to the west (top) | Q1 |
| lb | Zero known separators (bare) | Q1 |
| la | Zero known separators (ambiguous) | Q1 |
| la2 | la, two separators | Q2 |
| la1 | la, one separator | — |
| law | la1, Separator to the west | Q3 |
| lan | la1, Separator to the north | — |

Table 2 gives abbreviated names to the various stroke location contexts and summarizes the associated stroke location decisions. There is no decision associated with the le context; these pixels are not possible stroke locations. Potential lb, ls, lt, or la locations are decided with question Q1. Locations that are lb are less likely to contain strokes than those that are ls, lt, or la. This is because each domain typically touches more than one other domain and strokes that have already been drawn become likely locations for subsequent strokes.

Strokes with la locations are further classified by questions Q2 and Q3. Ambiguous locations that fill two separator sites are designated la2 and those that fill only one separator site are designated la1. Locations that are la1 and fill the western site are law and those that fill the northern site are lan.

On FIG. 2, the pixels corresponding to stroke locations are labeled with L and numbered 1–6. Locations one and four are lb. Strokes two and three have lt locations. Location five is ls. Location six is la and the additional Q2 decision made for la locations further classifies it as la2 since it has two associated separators.

Positively decided stroke locations can have one or two stroke chains. Locations that are la1, ls or lt have exactly one stroke chain that starts in the direction of the location filled separator site. Stroke locations that are lb or la2 have at least one chain. The chain starting along such a stroke location's western edge and heading south is drawn first. If that chain is not closed, a second chain is drawn starting along the northern edge and heading east. The chain starting to the south is also called the counterclockwise chain and the eastern heading chain is correspondingly the clockwise chain.

Stroke Chain Direction Context Model

Stroke chains are three direction chains. Typically, each chain follows the periphery of a single domain. Therefore, each counterclockwise chain has slightly more left turns and each clockwise chain has slightly more right turns. For example, a closed counterclockwise chain has four more left turns than right turns.

To take advantage of this statistical disparity, one possibility is to keep track of separate statistics for clockwise and counterclockwise chains. However, since this reduces the number of decisions in each context, sparse contexts become even sparser and may never develop good probability estimates. To overcome this problem, instead of turning left and right each chain turns inward or outward. An inward decision is a left turn for a counterclockwise chain and a right turn for a clockwise chain. Outward decisions equate to right and left turns respectively. With this transformation, the possible chain directions are: in, out, straight.

The probability estimation contexts used to reduce the information content of stroke chains are shown in Table 3–Table 5. A finite automata determines the context used to code each chain direction. The current context is shown in the first column of the tables and the transitions made upon each chain direction decision are shown in the following columns. Where appropriate, the automata's states are named using regular expression notation with the letters s, i, and o, corresponding to straight, inward, and outward respectively. The most recent decision is written on the right and older decisions shift to the left.

TABLE 3

Initial Chain Direction Contexts

| Current State | Next State | | |
|---|---|---|---|
| | Straight | In | Out |
| ccws | ss | si | so |
| ccwi | is | ii | io |
| cws | ss | si | so |
| cwi | is | ii | io |
| ss | sss | ssi | sso |
| si | sis | sii | sio |
| so | sos | soi | soo |
| is | iss | isi | iso |
| ii | iis | ce | iio |
| io | ios | ioi | ioo |

The contexts of Table 3 are used for the initial segment of each chain. The context in which a chain starts determined by its chirality and its corresponding stroke location context. The statistical behavior of the initial direction taken by clockwise chains is typically significantly different from that of counterclockwise chains and this difference is exploited by starting the two types of chains in separate contexts. The difference is only significant for the first direction decision and following that the separate contexts are merged via appropriate finite automata state transitions.

TABLE 4

Depth Three Chain Direction Contexts

| Current State | Next State | | |
|---|---|---|---|
| | Straight | In | Out |
| sss | sss | ssi | sso |
| ssi | sis | sii | sio |
| sso | sos | soi | soo |
| sis | iss | isi | iso |
| sii | iis | err | iio |
| sio | ios | ioi | ioo |
| sos | oss | osi | oso |
| soi | ois | oii | oio |
| soo | oos | ooi | err |
| iss | isss | iss$^+$i | iss$^+$o |
| isi | sis | sii | sio |

TABLE 4-continued

Depth Three Chain Direction Contexts

| Current State | Next State | | |
|---|---|---|---|
| | Straight | In | Out |
| iso | sos | soi | soo |
| iis | iss | isi | iso |
| iio | ios | ioi | ioo |
| ios | (io)$^+$ss | osi | oso |
| ioi | i(oi)$^+$s | oii | io(io)$^+$ |
| ioo | oos | ooi | ooo |
| oss | osss | oss$^+$i | oss$^+$o |
| osi | sis | sii | sio |
| oso | sos | soi | soo |
| ois | (oi)$^+$ss | isi | iso |
| oii | iis | err | iio |
| oio | o(io)$^+$s | oi(oi)$^+$ | ioo |
| oos | oss | osi | oso |
| ooi | ois | oii | oio |
| ooo | oos | ooi | err |

TABLE 5

Expanded Chain Direction Contexts

| Current State | Next State | | |
|---|---|---|---|
| | Straight | In | Out |
| oi(oi)$^+$ | oi(oi)$^+$s | oii | oi(oi)$^+$o |
| io(io)$^+$ | io(io)$^+$s | io(io)$^+$i | ioo |
| io(io)$^+$i | i(oi)$^+$s | oii | io(io)$^+$ |
| oi(oi)$^+$o | o(io)$^+$s | oi(oi)$^+$ | ioo |
| iss$^+$o | sos | soi | soo |
| oss$^+$i | sis | sii | sio |
| iss$^+$i | sis | sii | sio |
| oss$^+$o | sos | soi | soo |
| isss | issss$^+$ | iss$^+$i | iss$^+$o |
| osss | ossss$^+$ | oss$^+$i | oss$^+$o |
| isss$^+$ | issss$^+$ | iss$^+$i | iss$^+$o |
| osss$^+$ | ossss$^+$ | oss$^+$i | oss$^+$o |
| i(oi)$^+$s | iss | isi | iso |
| o(io)$^+$s | oss | osi | oso |
| oi(oi)$^+$s | (oi)$^+$ss | isi | iso |
| io(io)$^+$s | (io)$^+$ss | osi | oso |
| (oi)$^+$ss | (pi)$^+$sss | iss$^+$i | iss$^+$o |
| (io)$^+$ss | (io)$^+$sss | oss$^+$i | oss$^+$o |
| (oi)$^+$sss | (oi)$^+$ssss$^+$ | iss$^+$i | iss$^+$o |
| (io)$^+$sss | (io)$^+$ssss$^+$ | oss$^+$i | oss$^+$o |
| (oi)$^+$ssss$^+$ | (oi)$^+$ssss$^+$ | iss$^+$i | iss$^+$o |
| (io)$^+$ssss$^+$ | (io)$^+$ssss$^+$ | oss$^+$i | oss$^+$o |

Stroke locations that are la1 have exactly one of their separator sites filled as part of stroke location processing. This separator is typically a straight extension of a previously drawn boundary. Therefore, chains at la1 locations start in either the ccws or the cws context, the trailing s on each name indicating the implicit straight prefix. Table 6 summarizes the rules for initializing, the chain direction context model.

Stroke locations that are not la1 have two filled separators that define an implicit inward turn not part of any stroke chain. Even though this turn is not part of a chain, the chain direction context model can take advantage of it. Chains at locations with two separators start in either the ccwi or the cwi context, the trailing i on each name indicating the implicit inward turn.

After the first separator of a stroke chain is drawn the chain direction context model evolves to one of the six depth two contexts in Table 3. The previously described implicit direction is the oldest direction in each of these pairs. The first explicit chain direction is the newest direction.

After the second separator of a stroke chain is drawn the context model evolves to the standard depth three Markov contexts shown in Table 4. The context iii cannot occur and is omitted from the table. Transitions to illegal contexts are labeled with err.

TABLE 6

Initializing the Chain direction Context Model

| Chirality | Location | Initial Context |
|---|---|---|
| ccw | la1 | ccws |
| ccw | not la1 | ccwi |
| cw | la1 | cws |
| cw | not la1 | cwi |

Subsequent transitions either remain within Table 4 or evolve to one of the expanded contexts in Table 5. Once the context model has entered the expanded contexts it may remain there on subsequent transitions or collapse back to one of the depth three Markov contexts. The expanded contexts together with the depth three Markov contexts capture the statistics of raster drawn lines and curves as well as a complete depth six Markov model. The implementation complexity, however, is only slight greater than a standard depth three model. Also, since the hybrid model contains far fewer contexts it more often avoids the sparse context problem and has near optimal performance on a wider range of partitions.

In keeping with the binary decision nature of the rest of the stroke code, the ternary direction decision is transformed to two binary decisions via a two level coding tree. Question Q5 differentiates between straight and turn. If the answer to Q5 is no, question Q6 decides between in and out. Therefore, each line of Table 3–Table 5 splits into two lines corresponding to two binary contexts. The primary context retains the designation used in the first column of the tables. The designation of the secondary context is formed by appending /t to the designation of the first. When question Q5 is posed a primary context is always active. If the answer is yes, a transition to the primary context indicated by the straight column of the tables is made. If the answer is no, a transition is made to the associated secondary context and question Q6 is posed. If the answer is yes, a transition to the inward primary context is made, otherwise a transition to the outward primary context is made. This is further illustrated in the example state transition table of FIG. 13.

Stroke Chain Termination Context Model

Figure 4:
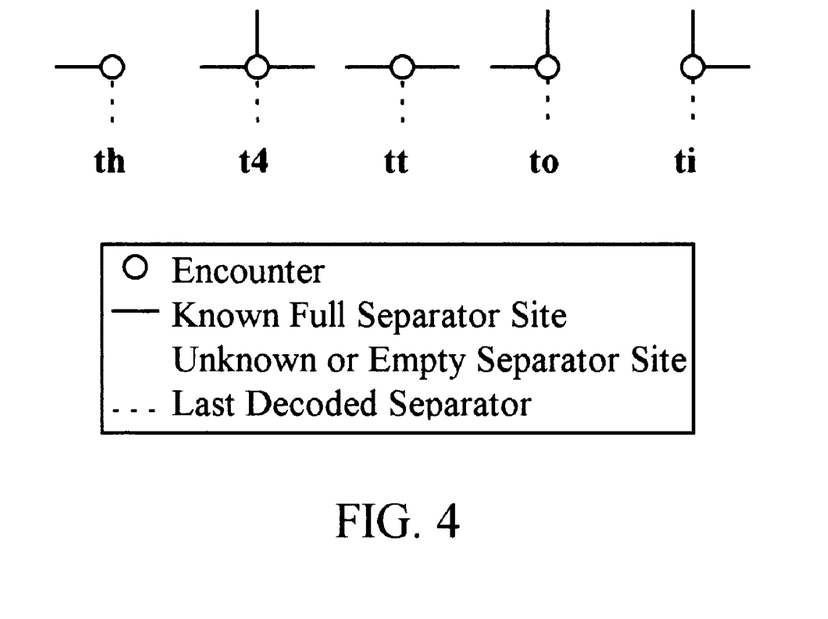
FIG. 4 is a graphical representation of the stroke termination context model used in the present invention.

One of the fundamental features of the stroke code is its mechanism for terminating stroke chains. This mechanism operates on the basis that encounters with previously filled boundary separators or with the image boundary are the only way to terminate stroke chains. Referring to Table 1, a Q4 decision is made at every encounter to determine if a chain terminates or continues. The different types of possible encounters are illustrated in FIG. 4 for an example northward heading counterclockwise chain.

Some observations can be made about each type of encounter. Since after each stroke is completed all separators drawn thus far have no hanging ends, only one hanging end encounter is possible: an encounter with the beginning of the current chain. A hanging end encounter only occurs if a stroke's counterclockwise chain is closed. A chain making a hanging end encounter must terminate and no termination question need be posed. Since there is no empty separator site by which to exit, a chain encountering a four-way intersection must also terminate and again no termination question need be posed. A tee intersection has one possible exit path, but depending upon the method used by an encoder to generate strokes, it may never be taken. A corner intersection may be constrained inward or outward. An inwardly constrained corner has a single possible exit in the inward direction. An outwardly constrained corner has an analogous exit in the outward direction. Again, depending upon the method used to generate strokes, the outwardly or inwardly constrained exits may never be taken.

Note how any continued chain has only one exit path. This means that a continued chain's next movement is known. The stroke chain proceeds from the head of this implicitly known separator.

On the stroke example of FIG. 2, there are eight encounters. Stroke 1 is closed and therefore makes a hanging end encounter with itself. Stroke 2 makes a constrained outward encounter with stroke 1 and terminates. Strokes 3 and 4 have terminating tee encounters with stroke 1. Stroke 5 makes a constrained inward encounter with stroke 1 and a constrained outward encounter with stroke 3 where it terminates. Stroke 6 has two encounters with the image boundary. Encounters with the image boundary are always terminating.

TABLE 7

Stroke Chain Termination Contexts

| Name | Type of Encounter | Decision |
|---|---|---|
| th | Hanging end | — |
| t4 | Four-way intersection | — |
| tt | Tee intersection | Q4 |
| ti | Corner intersection constrained inward | Q4 |
| to | Corner intersection constrained outward | Q4 |

The five stroke chain termination contexts are summarized in Table 7. On sparse partitions, boundary encounters are fairly infrequent and those that do occur are frequently terminating. Further, an encoder can arrange for higher skew statistics in some contexts. For example, if an encoder follows the boundary of a single domain at each stroke, tee and constrained outward encounters are never continued. Taken together, these characteristics make stroke termination information a negligible portion of the total code string for partitions where the average domain size is greater than 16 pixels.

Stroke Decoding Apparatus

Figure 5:
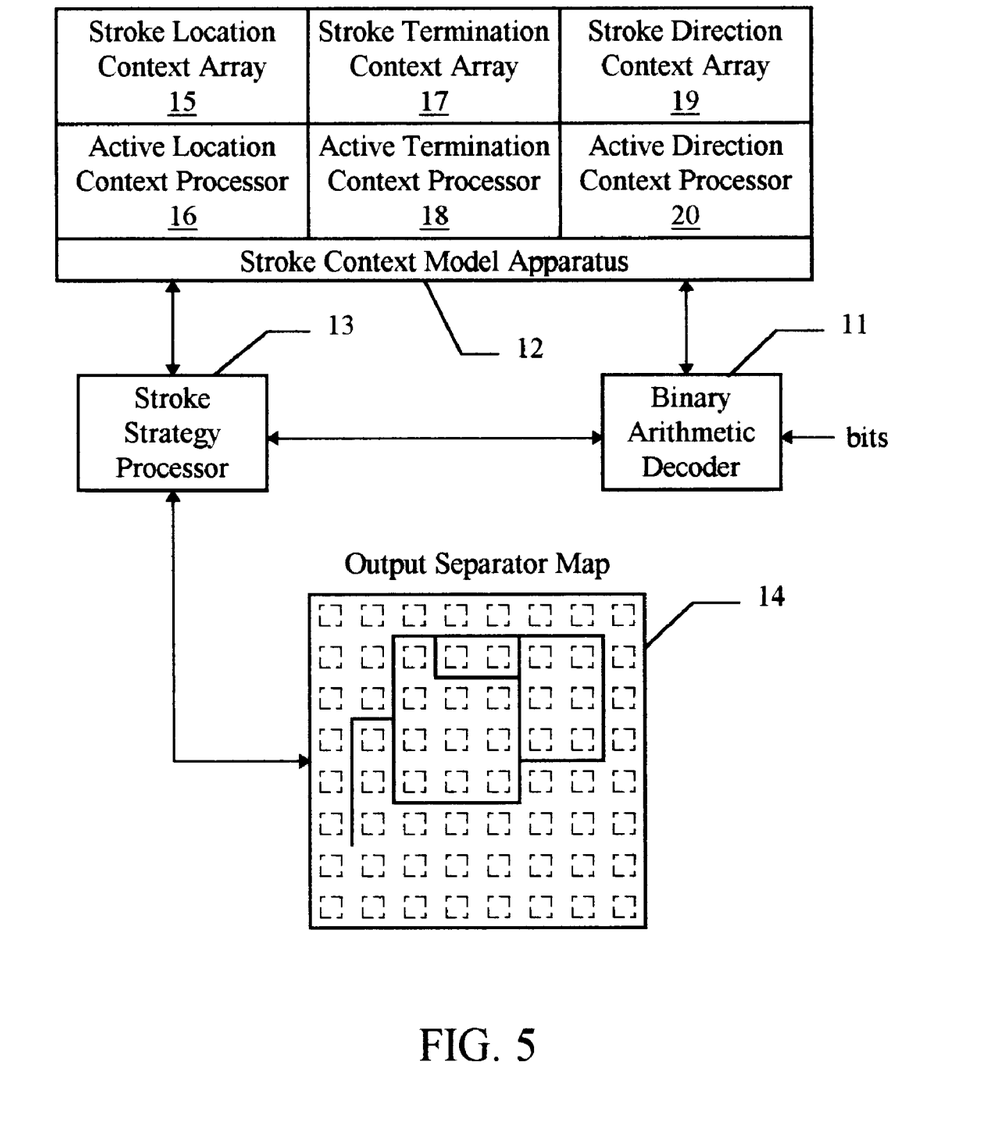
FIG. 5 is a block diagram of a stroke decoder in accordance with the present invention.

FIG. 5 is a block diagram of stroke decoding apparatus for developing an image partition from an encoded input bit stream composed of interleaved binary location, direction and termination decisions. The decoder consists of a binary arithmetic decoder 11, a stroke context model apparatus 12, a stroke strategy processor 13 and an output separator map 14. The stroke context model apparatus 12 is subdivided into a stroke location context array 15, an active location context processor 16, a stroke termination context array 17, an active termination context processor 18, a stroke direction context array 19, and an active direction context processor 20.

The binary arithmetic decoder decodes the input bit stream and provides answers to questions Q1–Q6 of Table 1 posed by the stroke strategy processor 13. It also maintains the statistics stored in the context arrays of the stroke context model apparatus 12.

Figure 13:
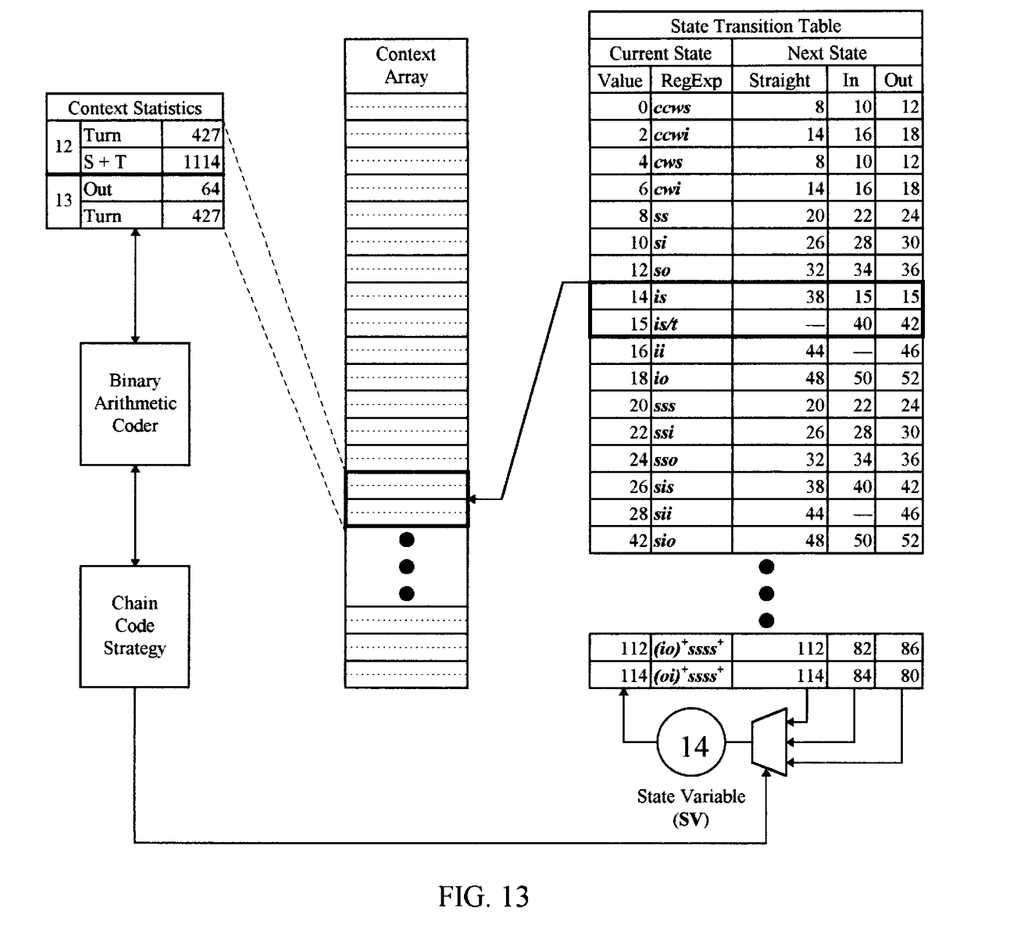
FIG. 13 shows chain direction context determining apparatus in accordance with present invention.

The stroke location context array 15 stores statistics for the stroke location contexts of Table 2, the stroke termination context array 17 stores statistics for the stroke termination contexts of Table 7, and the stroke direction context array 19 stores statistics for the stroke direction contexts of Tables 3–5. Associated with each of the context arrays is a processor for determining the active context at each step in the decoding process. In the preferred embodiment of the invention, the stroke direction context array and active direction context processor are embodied in a finite automata as illustrated in FIG. 13.

The stroke strategy processor consists of digital logic or a computer program for executing the flow charts of FIGS. 7–12. The output separator map is a digital memory containing one bit for every separator lattice site in the output partition.

Stroke Encoding Apparatus

Figure 6:
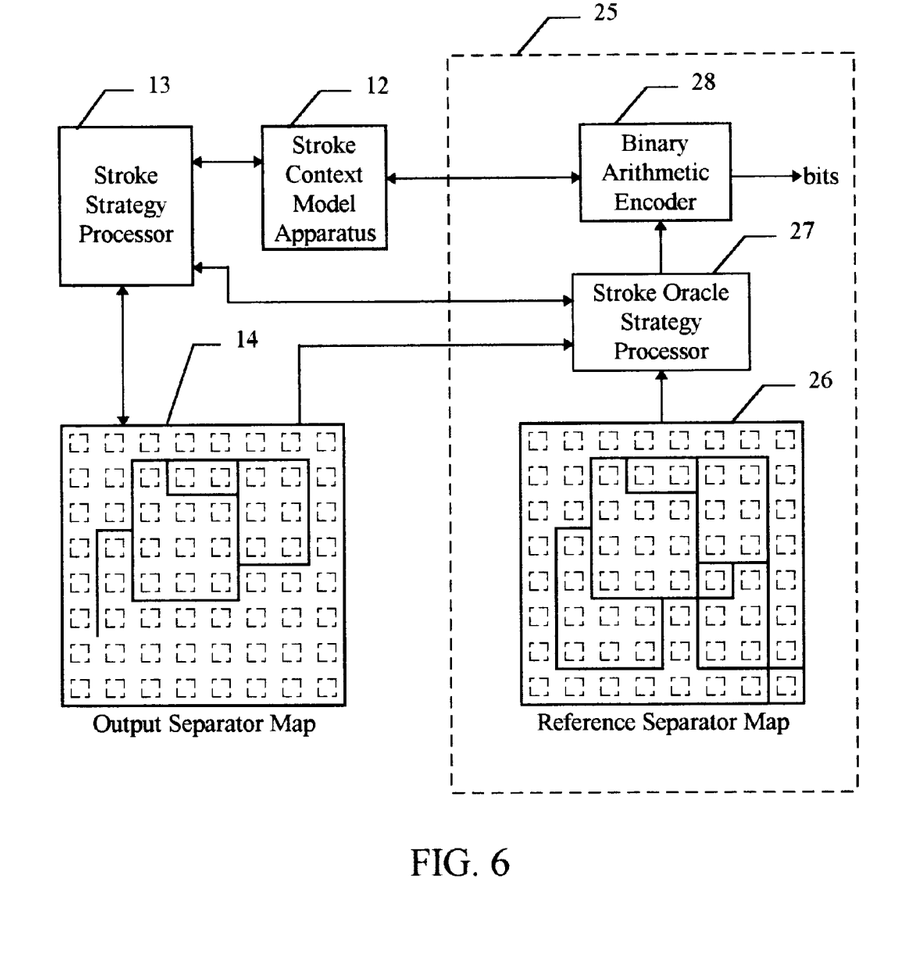
FIG. 6 is a block diagram of a stroke encoder in accordance with the present invention

FIG. 6 is a block diagram of a stroke encoding apparatus. A stroke encoder consists of a stroke decoder with its binary arithmetic decoder replaced with a stroke oracle 25. The primary function of the stroke oracle is to furnish answers to questions Q1–Q6 normally provided by the defunct arithmetic decoder.

The stroke oracle consists of a reference separator map 26, a stroke oracle strategy processor 27, and a binary arithmetic coder 28. The oracle also has read access to the output separator map 14 constructed by the stroke decoder. The oracle strategy compares its reference separator map with the output separator map when simulating answers to stroke decoder questions.

Simulated answers are also routed to the binary arithmetic encoder which produces the output code stream. The arithmetic encoder uses the stroke context model apparatus 12 of the stroke decoder to encode each decision. It also updates context statistics following each encoded decision exactly as would the defunct arithmetic decoder.

TABLE 8

Stroke Oracle Answers

| Question | Answer |
|---|---|
| Q1 | L.side != Lr.side \|\| L.top != Lr.top |
| Q2 | Lr.side == full && Lr.top == full |
| Q3 | Lr.side == full |
| Q4 | TC == tt \|\| TC == to \|\| in(Sr) == empty |
| Q5 | in(Sr) == empty && straight(Sr) == full |
| Q6 | in(Sr) == full |

The stroke oracle strategy processor consists of digital logic or a computer program for simulating answers to stroke decoder questions according to the logical equations of Table 8. The equations are written using the syntax of the C programming language. If an equation evaluates to "0" the oracle yields a no answer and yields yes otherwise.

The separator lattice variable L, separator site variable S, and termination context variable T are that of the decoder's stroke strategy processor 13. The lattice variable Lr is the equivalent of location L but on the oracle's reference separator map. The separator site variable Sr is the equivalent of site S but on the reference separator map. The terms side, top, full and empty are defined in the description of the stroke strategy.

The functions straight(Sr), in(Sr) and out(Sr) operate on the oracle's reference separator map. The function in(Sr) returns the separator site to the left of the head of Sr if the value of the stroke strategy's chirality variable (C) is "ccw" and the site to the right otherwise. The function out(Sr) returns the separator site to the right of the head of Sr if the value of C is "ccw" and the site to the left otherwise. The function straight(Sr) returns the separator site just ahead of Sr.

The equations of Table 8 produce the following consequences. First, any separator that is full on the reference map and is not full on the decoder's map will be filled during stroke location processing for its associated pixel. Therefore, stroke chains can never go north of their start location and can never go west of their start location on the same row. Second, stroke chains follow the outer boundary of the domain containing the stroke's location. This domain is called the home domain. Third, tee or outwardly constrained encounters are always terminating. Last, inwardly constrained encounters are continued only if the continued separator is filled on the reference map and unfilled on the decoder's map. This only occurs for separators on the home domain's outer boundary that have not yet been encoded.

Stroke Strategy Apparatus

Figure 7:
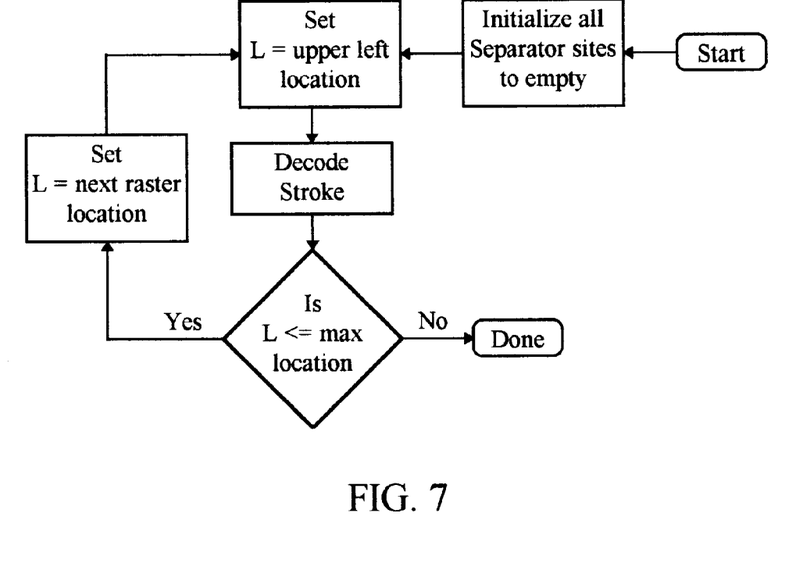
FIGS. 7–12 are flowcharts illustrating the functioning of the stroke strategy of the present invention.

FIGS. 7–12 are flow charts representing operations performed by a stroke decoding apparatus. The flow charts are hierarchically arranged. The decode partition operation is the highest level of the hierarchy and is shown in FIG. 7. The decode partition operation makes use of the decode stroke operation of FIG. 9. In turn, decode stroke encompasses decode CCW chain of FIG. 10 and decode CW chain of FIG. 11. The chain decode operations use the decode termination operation of FIG. 12 and the decode chain direction operation of FIG. 8. The operations communicate through global variables L, C, SV, S, and T. Descriptions of these variables are given upon first use in the following description.

Decode partition begins by initializing all separator sites in the boundary map to empty, indicating no separators are present. It then performs the decode stroke operation in raster order for every separator lattice intersection in the image. The global variable L holds the current lattice intersection.

Figure 9:
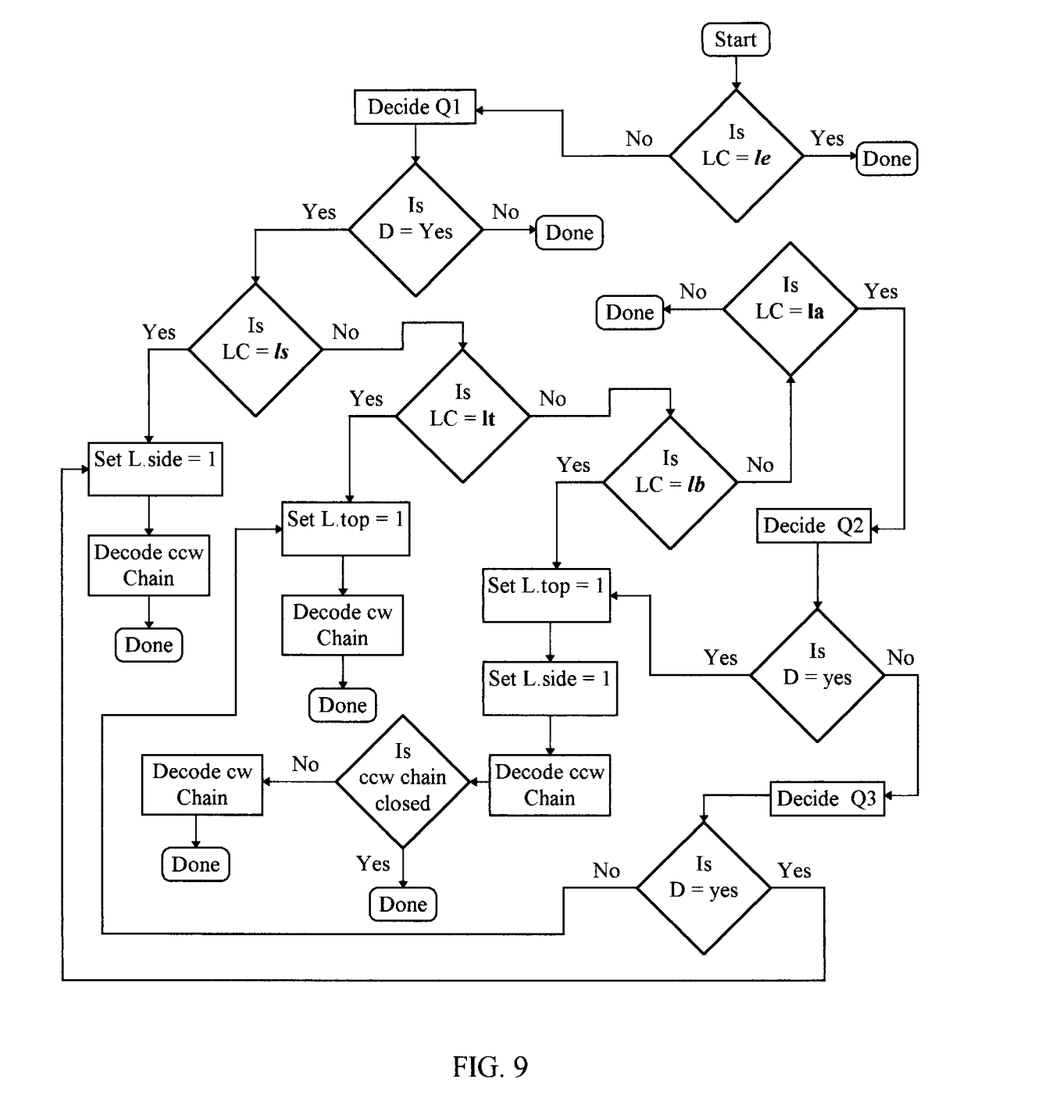

Decode stroke first determines if the stroke location context (LC) for site L is enclosed. If it is not, a Q1 binary decision is made to determine if L is a stroke location. If L is not a stroke location, processing is complete. Otherwise, if L is a side location its side separator is filled and the decode ccw chain operation is performed. If L is a top location its top separator is filled and the decode cw chain operation is performed. If L is bare both of its separator sites are filled and the decode ccw chain operation is performed. If the ccw chain is not closed the decode cw chain operation is performed.

If L is ambiguous, a Q2 decision is made to determine if L has two separators. If the answer is yes, both of L's separator sites are filled and the decode ccw chain operation is performed. If the ccw chain is not closed the decode cw chain operation is performed. If L has one separator a Q3 decision determines which one. If the answer to Q3 is yes, L's side separator site it is filled and the decode ccw chain operation is performed. Otherwise, its top site is filled and the decode cw chain operation is performed.

Figure 10:
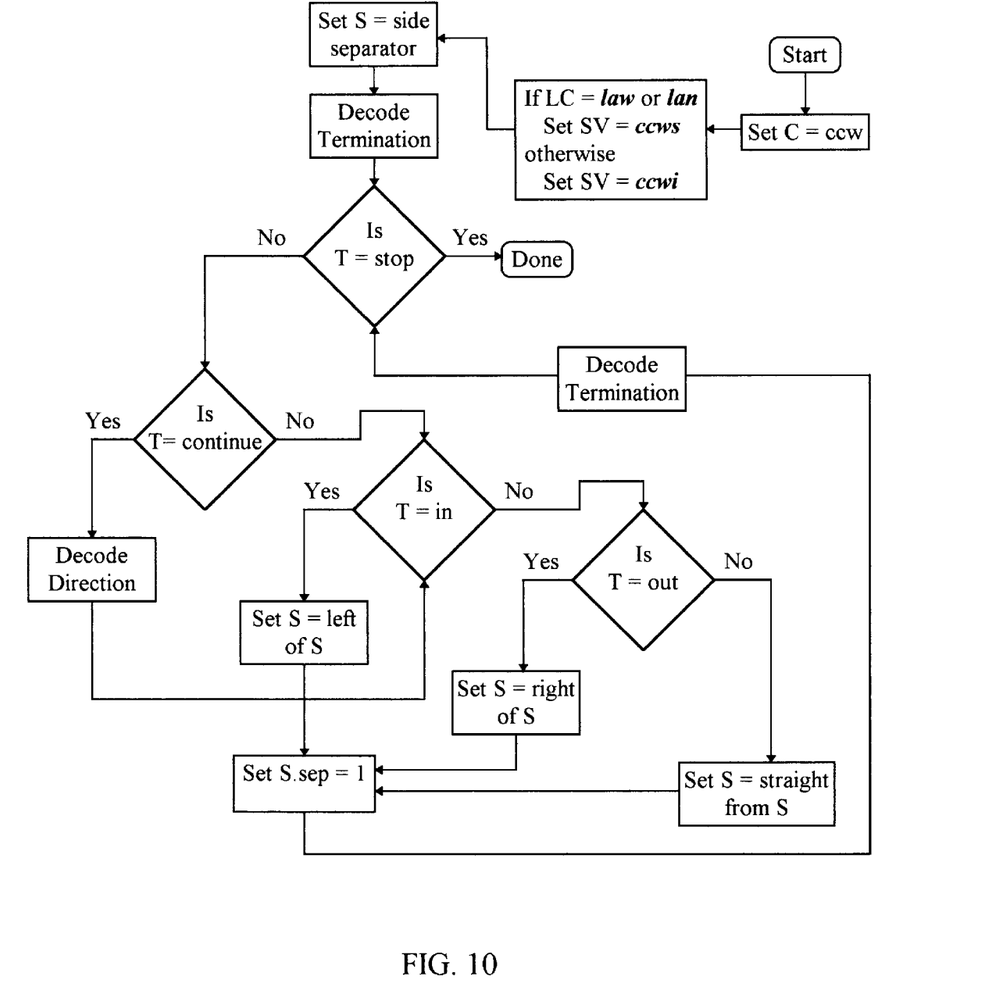

Decode ccw chain first sets the chirality variable C to "ccw", the current separator variable S to the side separator of L and the chain direction context model's state variable (SV) to ccws if LC for site L is la1 and to ccwi otherwise. It then loops performing decode termination and decode direction operations. Decode termination returns a termination type in the global variable T. If the value of T is "stop" decode ccw chain is done. If the value of T is "continue" the decode direction operation is performed to obtain the next direction, otherwise T already holds the next direction from a continued termination encounter. If T is "in" S is set to the separator to the left of the head of S, or if T is "out" S is set to the separator to right of the head of S, or if T is "straight" S is set to the separator just ahead of the head of S.

Figure 11:
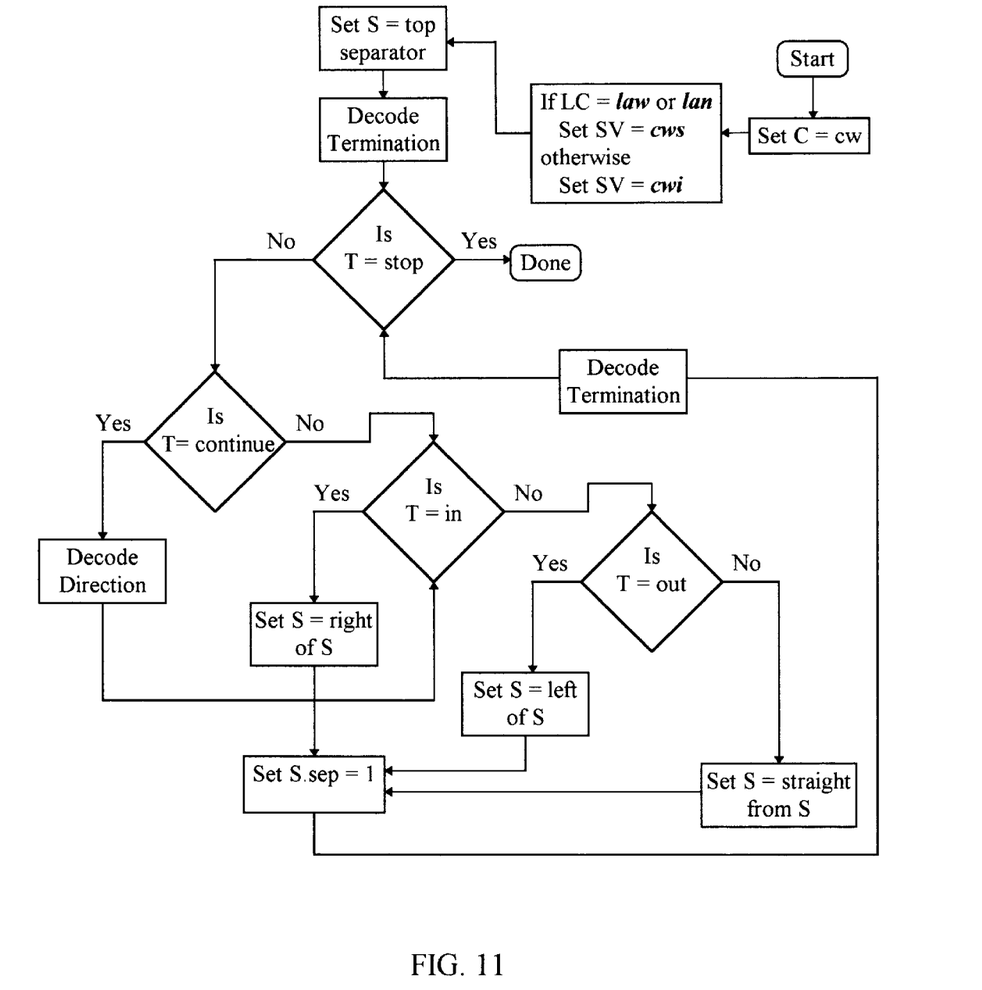

Decode cw chain first sets the chirality variable C to "cw", the current separator variable S to the top separator of L and the chain direction context model's state variable (SV) to cws if LC for site L is la1 and to cwi otherwise. It then loops performing the decode termination and decode direction operations. Decode termination returns a termination type in the global variable T. If the value of T is "stop" decode cw chain is done. If the value of T is "continue" the decode direction operation is performed to obtain the next direction, otherwise T already holds the next direction from a continued termination encounter. If T is "in" S is set to the separator to the right of the head of S, or if T is "out" S is set to the separator to left of the head of S, or if T is "straight" S is set to the separator just ahead of the head of S.

Figure 12:
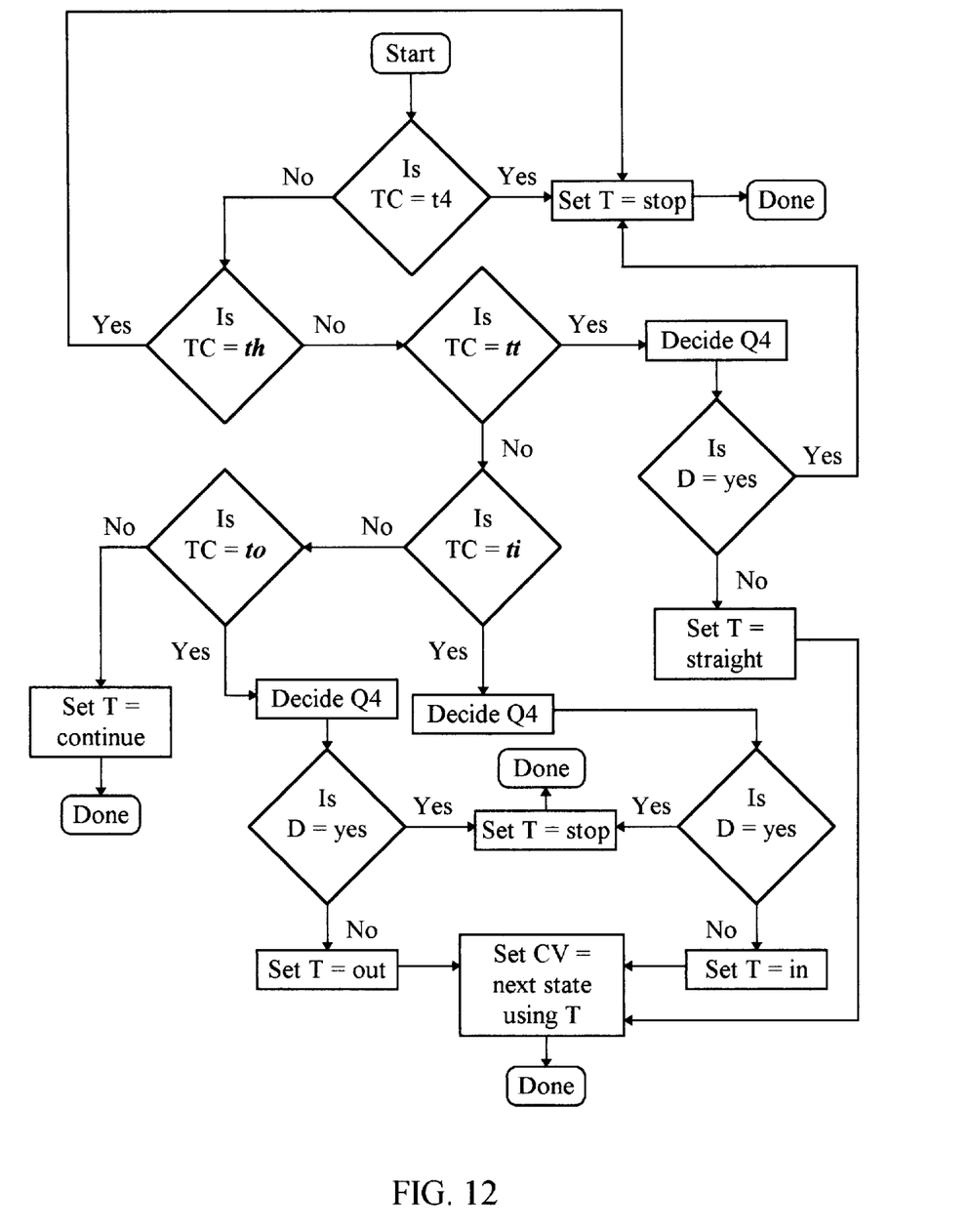

Decode termination first checks the termination context at the head of S. If the termination context is t4 or th it sets the global variable T to "stop". Otherwise, it makes a Q4 decision. If the answer is yes it sets the value of T to "stop". Otherwise, it sets the value of T to "straight", "in", or "out" for termination contexts of tt, ti, or to respectively and updates SV according to Tables 3–6 and using T as input to the automata.

Figure 8:
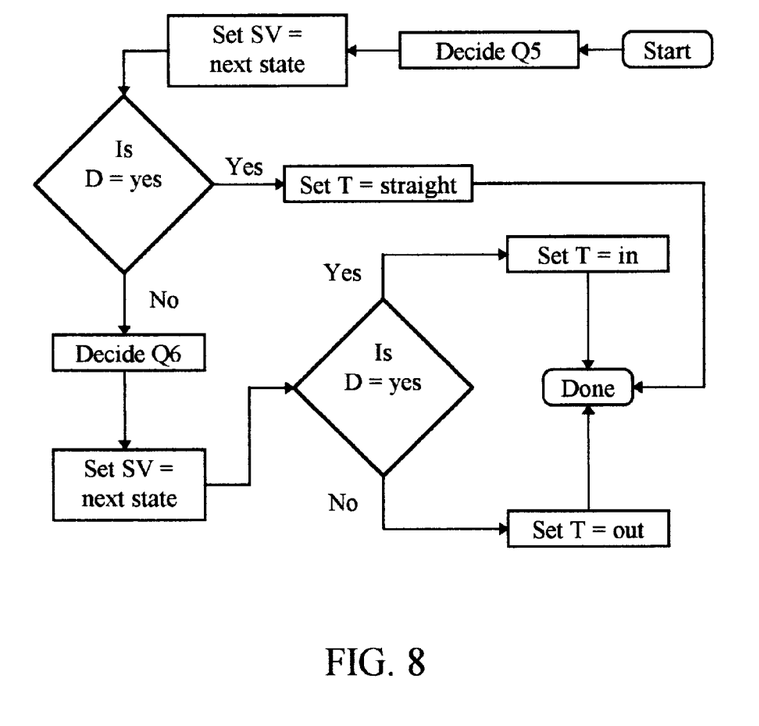

Decode direction first makes a Q5 decision and updates SV according to Tables 3–6. If the answer is yes, it sets T to "straight". Otherwise, it makes a Q6 decision and again updates SV according to Tables 3–6. If the answer is yes it sets T to "in", otherwise it sets T to "out".

Chain Direction Context Model Apparatus

FIG. 13 shows a fixed sized apparatus for implementing a variable depth chain direction context model. It consists of a finite automata, exemplified by the state variable and state transition table, and an array of context statistics. Blocks representing a binary arithmetic coder and an arbitrary chain code strategy show how the apparatus is used in an encompassing chain code. Operation of the context model is identical in either an encoder or a decoder.

Each element of the context array contains decision statistics. For a binary decision, two integer counts are necessary and sufficient to keep complete zero order statistics. The levels of the decision tree are interleaved in the context array. The even elements of the context array correspond to the first level of the tree and the odd elements to the second. The interleaving is done only to increase clarity of the description. Any ordering is possible.

Contexts 14 and 15 are expanded on the figure to show example statistics. Counts of the number of straights plus turns, turns, and outward turns are kept. Note that the turn count is kept in both contexts. This redundancy makes the arithmetic coder interface simpler and more general but could be eliminated. Other counts could be kept as well, as long as individual statistics for each direction are derivable from them.

The finite automata consists of an integer to hold the current state, a state transition table to indicate the state next taken, and a set of integers that represent the input. The input is the external stimulus to which the automata reacts. In this case it is binary decisions made by a chain direction code . The state transition table contains two rows for each boundary state. The first row of each pair contains the transitions made after making a straight versus turn decision. The second row contains the transitions made after making an inward versus outward decision. The elements of each row are the new state assumed upon a given input. Only rows corresponding to states 14 and 15 are shown in full. To simplify the presentation, the two binary decisions are collapsed to an equivalent three-way decision in other rows of the table.

In a chain coder, the chain direction context apparatus operates as follows. The finite automata state variable (SV) is initialized to a starting state when beginning a new chain. As chain directions are coded, the state of the finite automata evolves according to its state transition table. One transition is made for each binary decision.

The output of the finite automata is its state. The state is used as a pointer into the context array. The element of the array pointed to is the active context used by the arithmetic coder for estimating decision probabilities. After each decision is made and before SV evolves, the arithmetic coder also updates the active context statistics.

As an example, the state transition table of FIG. 13 is shown loaded with the stroke chain direction context model of Tables 3–6 and the state variable is set to 14. If a straight movement is next made, the automata moves to state 38. Alternately, if a turn decision is made the automata moves to state 15 in preparation for coding the turn direction. If the automata is in state 15 and an inward movement is made, it moves to state 40. If an outward turn is made it moves to state 42.

I claim:

1. In an image coding process wherein the image is partitioned into a plurality of connected domains and wherein said partition contains at least one domain whose outer boundary both does not touch the image periphery and shares at least one separator with the outer boundary of a second domain, a method for three-way chain coding the boundaries of said partition while traversing all separators of the partition only once comprising the steps of:
   a) creating an empty output separator map of appropriate size, and
   b) repeating until all partition boundary separators in said output map have been filled the steps of:
      i) determining a stroke location in the output separator map where at least one associated separator site is both empty and lies along the partition boundary, and
      ii) determining which empty separator sites of said stroke location lie along the partition boundary, and
      iii) filling said empty sites lying along the partition boundary, and
      iv) at a first filled separator site of said stroke location, filling additional separator sites by starting from the head of said first filled site and repeating until termination is indicated the steps of:
         a) at encounters with previously filled separators determining if termination is indicated, and if termination is not so indicated filling the empty separator site just beyond the encounter, and
         b) at non-encounters with previously filled separators determining and filling a next separator site by making a three-way chain direction decision, and
      v) at a second filled separator site of said stroke location, filling additional separator sites by starting from the head of said second filled site and repeating until termination is indicated the steps of:
         a) at encounters with previously filled separators determining if termination is indicated, and if termination is not so indicated filling the empty separator site just beyond the encounter, and
         b) at non-encounters with previously filled separators determining and filling a next separator site by making a three-way chain direction decision.

2. The method defined in claim 1, wherein indication of chain termination is determined by posing question Q4 under five distinct contexts determined by the following separator patterns at each encounter:
   a) a single previously filled separator,
   b) three previously filled separators, c) two previously filled separators to the left and right, d) a previously filled separator on a first hand and a previously filled separator straight ahead, and e) a previously filled separator on a second hand and a previously filled separator straight ahead.

3. The method defined in claim 2, wherein empty stroke location separator sites lying along the partition boundary are determined by performing the steps of:

a) if the stroke location is lt then so determine the northern separator site, otherwise b) if the stroke location is ls then so determine the western separator site, otherwise c) if the stroke location is lb then so determine both associated separator sites, otherwise d) if the stroke location is la pose question Q2 and if answered affirmatively so determine both sites, otherwise e) pose question Q3 and if answered affirmatively so determine the western site and if answered negatively so determine the northern separator site.

4. The method defined in claim 3, wherein stroke locations are determined by scanning the output separator map in raster order and posing question Q1 at each pixel location.

5. The method defined in claim 4, wherein questions Q1 are posed under five distinct contexts determined by the following patterns of previously filled separators adjacent to each possible stroke location's associated separator lattice intersection:

a) two previously filled separators to the south and east, b) one previously filled separator to the south, c) one previously filled separator to the east, d) no previously filled separators to the north, south, east and west, and e) no previously filled separators to the south and east and two previously filled separators to the north and west.

6. The method defined in claim 5, wherein the vertical separator is preferred as a first filled separator if both sites of a stroke location are filled and wherein chains beginning at vertical separator sites are designated ccw and chains beginning at horizontal separator sites are designated cw and wherein three-way chain directions are determined by posing question Q5 and if answered negatively by posing question Q6.

7. The method defined in claim 6, wherein the first direction decision of each chain is made under one of four contexts determined by the rules of Table 6.

8. The method defined in claim 7 wherein the second direction decision of each chain is made under contexts determined by said chain's initial context and said chain's first direction according to the rules of Table 3, and wherein the third and subsequent chain direction decisions are made under contexts determined by previous chain directions according to the rules of Table 4 and Table 5.

9. The method defined in claim 8, wherein answers to questions Q1–Q6 are obtained from a binary arithmetic decoder connected to an encoded input bit stream.

10. The method defined in claim 9, wherein answers to questions are obtained from a stroke oracle operating in accordance with the rules of Table 8, and wherein said oracle also supplies said answers to a binary arithmetic encoder producing an output encoded bit stream.

* * * * *